United States Patent [19]

Zimmerman

[11] 4,013,833
[45] Mar. 22, 1977

[54] VIDEO SYSTEM AND METHOD FOR PRESENTATION AND REPRODUCTION OF X-RAY FILM IMAGES

[76] Inventor: Samuel Morton Zimmerman, 3530 Forest Lane, Suite 98, Dallas, Tex. 75235

[22] Filed: Aug. 14, 1975

[21] Appl. No.: 604,807

[52] U.S. Cl. .......................... 358/111; 178/DIG. 5
[51] Int. Cl.² ........................................ H04N 5/19
[58] Field of Search ............... 178/DIG. 5, DIG. 16, 178/DIG. 40, DIG. 29, 7.2, DIG. 39, DIG. 25, DIG. 26

[56] References Cited
UNITED STATES PATENTS

| | | | |
|---|---|---|---|
| 2,865,989 | 12/1958 | Zimmerman | 178/7.2 |
| 3,098,120 | 7/1963 | Diehl | 178/7.2 |
| 3,180,934 | 4/1965 | Altman | 178/7.2 |
| 3,389,220 | 6/1968 | Buzan | 178/DIG. 16 |
| 3,389,221 | 6/1968 | MacDonald | 178/7.2 |
| 3,535,443 | 10/1970 | Rieke | 178/7.2 |
| 3,578,908 | 5/1971 | Tompkins | 178/7.2 |
| 3,600,511 | 8/1971 | Cooksey | 178/7.2 |
| 3,691,302 | 9/1972 | Gaebele | 178/7.2 |

Primary Examiner—Robert L. Richardson
Assistant Examiner—Edward L. Coles
Attorney, Agent, or Firm—Peter J. Murphy

[57] ABSTRACT

X-ray film images are projected onto the target plate of a video pickup tube such as a vidicon, in a video camera of the type used in closed video systems. The camera includes special circuits to compensate for the wide variation in intensity of light which will be projected from x-ray films these circuits including means for automatic brightness control and means for automatic target voltage control. The circuits for automatic brightness control include an amplification correction circuit which utilizes a portion of the amplified composite video signal to produce a DC correction voltage which is applied to the gain biasing circuit of one video amplifier stage to either increase or reduce the gain in response to the projected light, and a blanking correction circuit provides a DC correction voltage to be applied to the clamping circuit to correct the blanking pulse or pedestal amplitude in response to the amount of light projected. The target voltage control increases or reduces the target voltage in response to the projected light.

14 Claims, 3 Drawing Figures

VIDEO SYSTEM AND METHOD FOR PRESENTATION AND REPRODUCTION OF X-RAY FILM IMAGES

BACKGROUND AND SUMMARY OF THE INVENTION

This invention relates to a system and method including a video camera and video display devices and associated apparatus for instantaneously viewing, transmitting and reproducing the images recorded on x-ray film; and more particularly to a video camera, for use in such a system, with automatic control to correct the video signal in relation to the overall level of light projected through the x-ray film.

An object of this invention is to provide an improved system and method for viewing x-ray film by means of video monitors.

Another object of this invention is to provide an improved system and method, including a novel video camera and controls, for viewing back lighted x-ray film.

A further object of this invention is to provide a novel video camera with control systems for automatically adjusting the video camera output to the levels of light projected to the camera.

Still another object of this invention is to provide a novel video camera with automatic control means for adjusting and maintaining the proper ratio of video signal amplitude and blanking pedestal amplitude, for the purpose of maintaining proper brightness and contrast levels of the picture quality in relation to the variation in light transmitted to the camera.

Another object of this invention is to provide a novel video camera including circuitry for automatically controlling the voltage level of the target electrode in relation to the variation in light transmitted to the camera.

An important overall object of this invention is to provide a system and method for video viewing of x-ray film with acceptable resolution for all investigative purposes whether medical, industrial or other; and to produce a video signal enabling high quality tape recording, and for later reproduction of a video image with acceptable resolution.

Still another object of this invention is to provide a system and method for high quality transfer of x-ray images from x-ray film to video tape enabling significant storage and reproduction economies in relation to storage and later display of conventional x-ray film.

Another important object of this invention is to provide a novel video camera having circuitry for reproducing, without distortion or degradation of picture quality, the full range and spectrum of the total gray scale from "reference black" to "peak white", and with full reproduction of each and every minute shade of gray that necessarily appears in viewing x-ray film.

Still another object of this invention is to provide a novel video camera including circuitry which permits the camera to view, without distortion, direct incoming light rays from the subject film, and still reproduce and delineate the remainder of contrast and detail of an x-ray film. A related object is to produce this result with automatic circuitry and without the need for any "operating" control adjustments.

These objects are accomplished in a video camera which includes a pickup tube with electron beam generating means and a target plate, means for vertically and horizontally deflecting the electron beam, means for generating blanking and synchronizing signals for blanking the electron beam and controlling the deflection means in synchronism therewith, amplifying means including a plurality of stages connected to the output of the target plate for amplifying the composite video signal produced thereby, and clamping circuit means for coupling the blanking signal generating means and the amplifying means. The amplified composite video signal is fed to an amplification correction circuit which includes means for removing the blanking component from the composite video signal, means for rectifying the remaining video signal component to produce a varying DC reference voltage signal proportional to the video signal component, and means for feeding this DC reference voltage signal as an amplification correction signal to the output bias voltage circuit for one of the video amplifier stages for varying the gain of that one amplifier stage. The amplified composite video signal is also fed to a pedestal amplitude correction circuit which includes means for restoring the DC component of said composite video signal, RC network means for producing an output signal corresponding to the average value of the restored DC signal as a pedestal level correction signal, and feeding that correction signal to the clamping circuit for correcting the pedestal level at the video amplifier. A target voltage correction circuit includes a series DC bias voltage circuit connecting the target plate with a regulated DC voltage source, the series circuit including an ultra-high resistor, a variable resistor defining a voltage limiter, and a load resistor. The voltage limiter enables the setting of an optimum level of target voltage which will be automatically adjusted above and below the optimum value by the flow of target plate current.

The novel features and the advantages of the invention, as well as additional objects thereof, will be understood more fully from the following description when read in connection with the accompanying drawings.

DRAWINGS

DESCRIPTION OF THE PREFERRED EMBODIMENT

Figure 1:
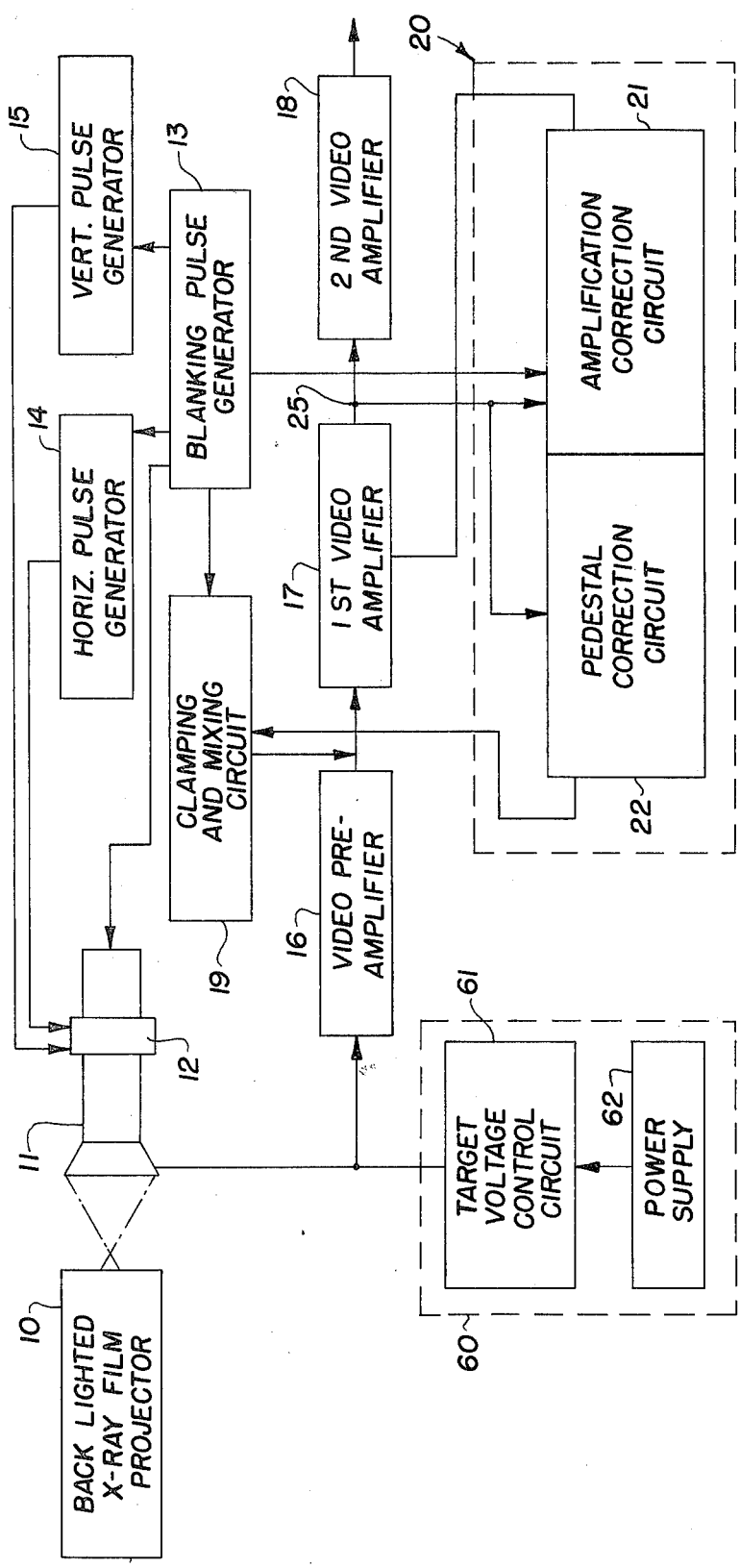
FIG. 1 is a diagrammatic illustration of the overall video camera system according to the invention.

FIG. 1 of the drawing is a combination schematic and diagrammatic illustration of the overall control circuitry for a video camera including a video pickup tube of the type known as a vidicon or a plumbicon tube for example. The portions of the control circuitry in FIG. 1 which are not enclosed in broken lines may follow known technology for video cameras and particularly may be similar to the camera circuit described in applicant's U.S. Pat. No. 2,865,989 issued Dec. 23, 1958. The camera circuit described in applicant's prior patent is particularly adapted for a camera for use in a closed circuit video system, and the composite video signal which is the output of this patented camera circuit is a composite signal consisting of a video signal and blanking signals (pulses) which function additionally as the synchronizing signals for controlling the reproduction of the video image on a video monitor. The circuit portions outlined in broken lines in FIG. 1 represent modifications or additions to the circuitry represented by applicant's prior patent; and these circuit portions are further illustrated in other figures of the drawing, and represent the improved camera control circuitry which is the subject of this invention.

Referring to FIG. 1 the system includes a back lighted x-ray film projector 10 which passes light through one or more x-ray films to project a light image onto the target plate of a video pickup tube 11. This tube may be the type known as a vidicon or plumbicon, for example. For the following described circuit components of the video camera, it will be understood that these are powered by suitable power supplies not indicated in the drawings.

The pickup tube 11 includes an electron gun for producing an electron beam to sweep the target plate of the tube, which target plate includes a mosaic of light sensitive globules; and the tube includes beam deflection coils or equivalent components 12 which sweep the beam relative to the target plate in a programmed manner. The gun is controlled by a blanking pulse generator 13 which, in turn, controls a horizontal sweep signal generator 14 and a vertical sweep signal generator 15 which energize respectively the horizontal and vertical deflection coils 12. The blanking pulse generator also controls the output of the electron gun to interrupt the electron beam during both horizontal and vertical retrace sweeps of the beam.

The composite video output signal from the pickup tube 11 is fed through several amplifier stages identified, by way of example, as a video preamplifier 16, a first video amplifier 17 and a second video amplifier 18. The output from the second video amplifier is the video camera output, which is fed to a video monitor or other video receiving device such as a video tape recorder.

Blanking pulses are also fed from the blanking pulse generator 15 to a clamping and mixing circuit 19 which performs the function of adding to or reinforcing the blanking pulse signal of the composite video signal which is the output from the video preamplifier 16, and in synchronism therewith for the purpose of establishing a pedestal level in the composite video signal.

The new and unique portions of the video camera circuitry, to be described in detail, include an automatic brightness control circuit 20 which includes an amplification correction circuit 21 and a pedestal correction circuit 22. The amplification correction circuit, as will be described, produces a varying DC correction signal which is proportional to the video signal, sampled in the video amplifier, and applies this correction signal to the gain of a preceeding amplifier stage to correct the gain of the video signal. The pedestal correction circuit produces a reference voltage signal related to the level of the sampled signal, and applies this reference voltage signal to the clamping and mixing circuit to correct the pedestal level at the video amplifier. An additional control circuit for controlling the video camera output is an automatic target voltage control circuit 60 which includes the target voltage control circuit 61 and a high voltage power supply 62.

The automatic brightness control circuit 20, along with the automatic target control circuit 60, provides complete automation of the video camera so that, with any type of x-ray to be viewed ranging from minimum passage of direct light to maximum passage of direct light, the camera will not require manual adjustment of any of such parameters as target voltage, beam intensity, beam focus, blanking pulse level and video gain, and will always produce pictures having high resolution and good gray scale quality. The amplification correction circuit 21 functions to correct the gain of the entire video amplification system and minimizes variations in gain which result from the variations in the amount of light projected through different x-ray films. The blanking correction circuit 22 functions to reduce variations within the composite video signal of the pedestal level, and to maintain such level at the most desirable value for optimum picture brightness.

Figure 2:
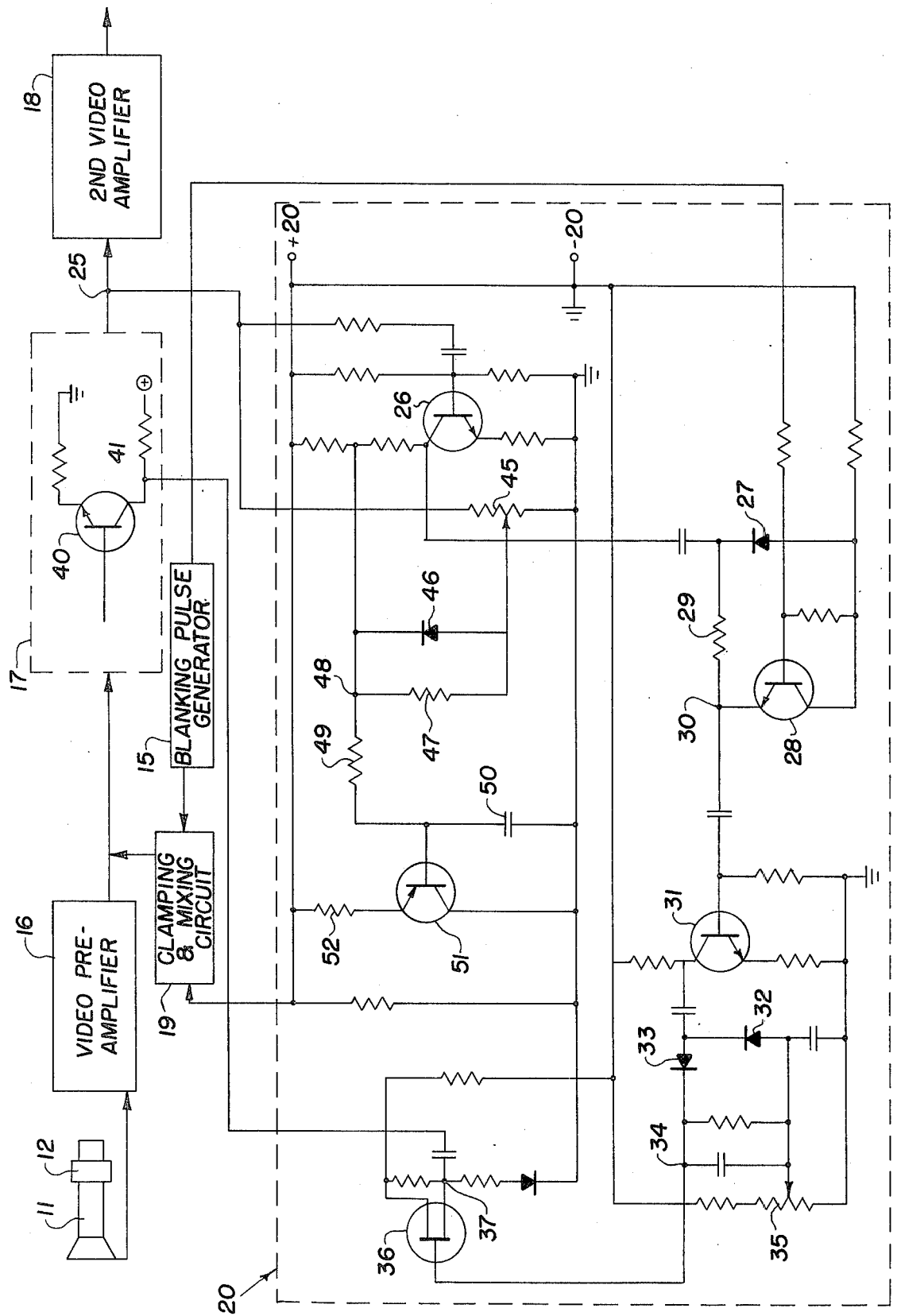
FIG. 2 is a combination diagrammatic and schematic illustration of a portion of the circuit of FIG. 1, illustrating schematically the automatic brightness control circuit.

Referring to FIG. 2, which illustrates diagrammatically the automatic brightness control circuit 20, the composite video at the output of the first video amplifier 17 (juncture 25), is fed to the base of a transistor amplifier 26 which functions as a buffer. A portion of the output signal from video amplifier 26 is fed to a circuit including solid state diode 27, transistor 28 and resistor 29. The original blanking pulse generated by the generator 15 is fed to the base of transistor 28; and the function of this circuit is to remove the blanking component so that the video signal, without blanking information appears, at the juncture 30 of the resistor 29 and transistor emitter. This signal is fed to the base of transistor amplifier 31; and the amplified video signal appearing at the collector of amplifier 31 is then rectified by the action of solid state diodes 32 and 33 to produce a varying DC reference voltage at the juncture 34, which reference voltage is proportional to the video signal sampled at the juncture 25. The level of this DC reference voltage at the juncture 34 is adjustable by means of a variable resistor 35 which functions as a set control to set the level of this DC correction voltage.

This DC correction voltage is fed to the gate of a field effect transistor 36, the output of which appears at juncture 37 and is connected at juncture 41 to the biasing circuit for the collector of transistor amplifier 40, which is one amplifier stage incorporated in the video amplifier 17 as represented in FIGS. 1 and 2. This of course varies the gain of the amplifier 40; thus the video signal level which is set by the setting of variable resistor 35 will be automatically maintained at such level due to the establishment of a variable DC voltage proportionate to the variation in the video signal level above and below the set level, such that with too much video gain the DC correction voltage causes a reduction in the output of the video amplifier 40, and conversely with too little video gain the DC correction voltage causes an increase in the gain of video amplifier 40. It should be noted that the variation in video signal amplitude is a direct result of the x-ray picture being viewed by the video camera; that is, more or less light will be projected onto the camera target plate by the x-ray films of different densities. The result is that the overall video signal amplitude at the output of the video camera will remain relatively constant for a great variation of types of x-rays being viewed.

The blanking correction circuit 22, which functions to maintain a steady level of blanking pulse amplitude (or pedestal amplitude) to accompany the automatic control of the video signal gain, will now be described. This circuit also includes the buffer amplifier which amplifies the composite signal, inverts the signal, and, coacting with the diode 46 restores the DC component of this signal. The same composite signal which is fed to the base of transistor 26 is applied to variable resistor 45, with the output voltage of variable resistor 45 being fed through diode 46 and resistor 47 for mixing with the output signal from amplifier 26 at the juncture 48. The variable resistor 45 then functions as a pedestal level set control for the restored DC signal; and this restored DC signal is then applied to an RC network consisting of resistor 49 and capacitor 50, causing an average value of the signal to appear at the output of an emitter-follower circuit including transistor 51 and resistor 52. This emitter-follower output is a correction signal for application to the clamping circuit 19 which controls the pedestal level of the composite video signal fed to the first video amplifier 17. It is the pedestal level which, in reference to the composite video signal, will determine the average brightness of the video picture. The clamping circuit then responds to variations in the sampled pedestal level, and maintains a set level by adding or subtracting deviation caused by the x-ray being viewed, as a function of percentage of video amplitude to pedestal amplitude.

AUTOMATIC TARGET VOLTAGE CONTROL

Figure 3:
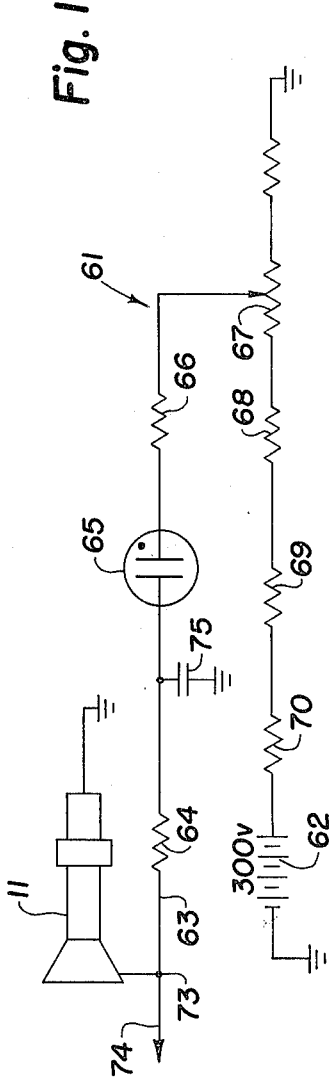
FIG. 3 is a diagrammatic and schematic illustration of a portion of the system of FIG. 1, illustrating diagrammatically the automatic target voltage control circuit.

FIG. 3 is a schematic illustration of the automatic target voltage control system 60 including the control circuit 61, and wherein the power supply 62, which provides, for example, an electronically regulated DC voltage source of 300 volts, is represented by the battery 62 which supplies the plate voltage to the target plate or target electrode of the pickup tube 11.

Referring to FIG. 3, the target plate varying DC current, produced by the sweeping of the tube electron beam across the plate illuminated by the porjected x-ray film image, follows a path through conductor 63, load resistor 64, neon bulb 65, resistor 66, variable resistor 67, resistor 68, special resistors 69 and 70, and the power supply 62. The power supply and the electron gun of the pickup tube 11 are connected to a common ground to complete this circuit. The voltage video signal appearing at the juncture 73 is fed to the video preamplifier through conductor 74. The capacitor 75 provides a path for the AC component of the video signal across the load resistor 64.

The variable resistor 67 functions as a voltage limiter for the circuit and may have a variable range of one-half megohm for example. The neon bulb 65 functions to stabilize the total resistance in this circuit. The special resistors 69 and 70 provide ultra-high resistance in the circuit; and these resistors are preferably of the carbon type enclosed in an evacuated envelope to eliminate interference from dust or other foreign particles. Preferably each of these special resistors has a resistance of at least 400 megohms, and possibly up to 5000 megohms. With a combined resistance of at least 800 megohms then for the two special resistors, it is apparent that very, very small increments of change of direct current flowing through these resistors will produce significant voltage drops across the resistors. By setting the value of the voltage limiter resistor 67 (which should have a range of at least 500,000 ohms), a selected positive target reference voltage can be established for the optimum value of target plate DC current. Then, as the plate current increases above the optimum value, a greater voltage drop will appear across the special resistors 69 and 70 and subtract from the reference voltage; whereas, if the plate current decreases, a lesser voltage drop will appear and add to the reference voltage. Therefore, the effect is that, with a wide variation of light projected through different x-ray films onto the pickup face plate, the usual need for adjustment of the target voltage is completely eliminated by virtue of this circuit; and effectively, the video voltage signal appearing across the load resistor 64 is maintained at a constant level regardless of the variation of x-ray film viewing requirements.

FEATURES AND ADVANTAGES

What has been described is an improved system and method for viewing back lighted x-ray films with a video camera and to produce a video image on a monitor having fully acceptable picture quality, such as resolution and gray scale rendition, for medical or industrial diagnostic investigation. The system has the capability of viewing many sizes and types of x-ray film, ranging in size for example from a 14 × 17 inches medical x-ray to a 1 × 1½ inches dental x-ray, and the x-ray film varying widely with respect to the amount of opaqueness. The system and method of the invention performs the previously unaccomplished task of permitting a video camera or television camera to view, without distortion or degradation of picture quality, the direct oncoming light rays from a film projector, and reproduce and delineate the contrast and detail of the x-ray film scene automatically, that is without the need for any operating control adjustments of the video camera apparatus.

One particular use of the system and method is to enable video reproduction of x-ray images from x-ray film at the x-ray lab or film storage facility (in a hospital for example), which would serve as an "origination station", to one or more "viewing stations" which may be located, in a hospital, in cardiology facilities, surgery facilities, emergency facilities or intensive care facilities for example. Another use of the system is to record x-ray images for storage and preservation (as may be required by law) and for later presentation if necessary, which would satisfy the present urgent need for a modernized system of x-ray image storage, both from the standpoint of conserving space and from the standpoint of enabling later recall and presentation of the x-ray images. The present system of storing x-ray film negatives is most inefficient from the standpoint of storage space required, from the standpoint of the burdensome time consuming methods of storage of the film, and from the standpoint of retrieval of the x-ray film for reviewing. Presently known systems for seeking to achieve improved efficiency include microfilming, other minifilming and photographic copying systems; but none utilize the principles of electronic video techniques for recording and reproducing x-ray images.

Another aspect of a video storage and retrieval system is the development of recording and reproduction techniques utilizing magnetic tape, or other medium, for recording the video signal without distortion or degradation or the quality of the video signal and, by the same token, enabling reproduction of the video signal from the stored medium on a video monitor without distortion or degradation of the signal.

In addition to the presentation of x-ray images by means of a video signal in a closed circuit video system, the system and method of the invention may be used with ancillary equipment to transmit with the image video signal to distant locations by means of conventional transmitter and antenna systems.

The system and method of the invention involves the automatic control of three different aspects of the composite video signal which is produced by the video camera including (1) automatic control of video tube target voltage for control of the initial video tube signal output level; (2) automatic variable control of the blanking pulse level in the video camera circuitry, in relation to the level of the pure video signal for brightness level control; and (3) automatic control of the amplification or gain of the video signal produced by the video tube.

While the preferred embodiment of the invention has been illustrated and described, it will be understood by those skilled in the art that changes and modifications may be resorted to without departing from the spirit and scope of the invention.

What is claimed is:

1. In a video camera including a pickup tube with electron beam generating means and a target plate, means for vertically and horizontally deflecting the electron beam, means for generating blanking and synchronizing signals for blanking said electron beam and controlling said deflecting means in synchronism therewith, amplifying means including a plurality of stages connected to the output of said target plate for amplifying the composite video signal produced thereby, and clamping circuit means for coupling said blanking signal generating means and said amplifying means, the improvement comprising:

an amplification correction circuit; means for feeding the composite video signal from the output of one video amplifier stage to said amplification correction circuit;

said amplification correction circuit including: means for removing the blanking component from said composite video signal; means for rectifying the remaining video signal component of said composite video signal to produce a varying DC reference voltage signal proportional to said video signal component, and defining an amplification correction signal; and means for feeding said amplification correction signal to the output bias voltage circuit for one of said video amplifier stages for varying the gain of said one video amplifier.

2. A video camera as set forth in claim 1
said means for removing the blanking component from said composite video signal comprising a transistor; means for applying said composite video signal to the output circuit for said transistor; means for applying a blanking pulse signal to the base of said transistor, whereby the blanking pulse component of said composite video signal is cancelled at the output circuit of said transistor.

3. A video camera as set forth in claim 1
a pedestal correction circuit; means for feeding the composite video signal from the output of one video amplifier stage to said pedestal correction circuit;
said pedestal correction circuit including means for restoring the DC component of said composite video signal; an RC network means for producing an output signal corresponding to the average value of said restored DC signal; and means for feeding said RC output signal to said clamping circuit to correct the level of the blanking pulses fed to said amplifier means;
said ultra-high resistor comprising at least one resistor having a resistance of at least 800 megohms; and said voltage limiter variable resistor having a range of about 0.5 megohms; and wherein the target plate voltage available from said voltage source is 300 volts.

4. A video camera as set forth in claim 1
a variable resistor in said amplification correction circuit for setting the level of said rectified amplification correction voltage signal; said variable resistor defining a video gain set control.

5. A video camera as set forth in claim 4
a field effect transistor; means for feeding said correction signal from said variable resistor to the gate of said field effect transistor; and means for feeding the output signal from said field effect transistor to said output bias voltage circuit for said one video amplifier stage.

6. In a video camera including a pickup tube with electron beam generating means and a target plate, means for vertically and horizontally deflecting electron beam, means for generating blanking and synchronizing signals for blanking said electron beam and controlling said deflecting means in synchronism therewith, amplifying means including a plurality of stages connected to the output of said target plate for amplifying the composite video signal produced thereby, and clamping circuit means for coupling said blanking signal generating means and said amplifying means, the improvement comprising:

a pedestal correction circuit; means for feeding the composite video signal from the output of one video amplifier stage to said pedestal correction circuit;
said pedestal correction circuit including means for restoring the DC component of said composite video signal; an RC network means for producing an output signal corresponding to the average value of said restored DC signal; and means for feeding said RC output signal to said clamping circuit to correct the level of the blanking pulses fed to said amplifier means.

7. A video camera as set forth in claim 6
means for feeding said composite video signal to the base of a transistor amplifier, and for feeding the output signal from said transistor amplifier to said RC network means; and second circuit means for feeding said composite video signal through a variable resistor for combining with the output signal from said transistor amplifier, said variable resistor thereby defining a pedestal level set control.

8. In a video camera including a pickup tube with electron beam generating means and a target plate, means for vertically and horizontally deflecting electron beam, means for generating blanking and synchronizing signals for blanking said electron beam and controlling said deflecting means is synchronism therewith, amplifying means including a plurality of stages connected to the output of said target plate for amplifying the composite video signal produced thereby, and clamping circuit means for coupling said blanking signal generating means and said amplifying means, the improvement comprising:

a target voltage correction circuit for coupling said target plate with a regulated DC voltage source; said control circuit including a series circuit for the flow of target plate current from said power source to said target plate; said series circuit including an ultra-high resistor, a variable resistor defining a voltage limiter, and a load resistor; and means coupled to the opposite side of said load resistor from said target plate providing a path for the AC component of target plate current.

9. A video camera as set forth in claim 8
said ultra-high resistor comprising at least one resistor having a resistance of at least 800 megohms; and said voltage limiter variable resistor having a range of about 0.5 megohms; and wherein the target plate voltage available from said voltage source is 300 volts.

10. A video camera as set forth in claim 9
said ultra-high resistor comprising at least one resistor of the carbon type enclosed in an evacuated envelope.

11. A method for producing a video picture of an x-ray film including the steps:
projecting light through an x-ray film picture to produce a light image, corresponding to the x-ray film image, at the target plate of a video camera pickup tube;
detecting the light image at said tube target plate by means of a mosaic of photo-sensitive globules thereon, thereby converting said light image to an electric image;
scanning said target plate with an electron beam to produce a varying electric signal corresponding to the produced electric image; producing timed blanking signals;
interrupting said electron beam, by means of said blanking signals, to produce a corresponding blanking pulses within said electric signal produced at said face plate, thereby producing a composite video signal including a video signal interrupted by blanking signals;
amplifying said composite video signal through a plurality of amplifying stages;
modifying the level of said blanking pulses in said amplified composite video signal;
feeding said amplified composite video signal to circuit means for producing a DC correction signal proportional to only the video signal of said composite video signal;
applying said correctional voltage signal to the output circuit of one video amplifier stage to vary the gain of said amplifier stage.

12. A method as set forth in claim 11
feeding a portion of said amplified composite video signal from the output of one amplifier stage; and feeding said correction voltage signal to the output voltage bias circuit of a preceding amplifier state.

13. A method as set forth in claim 11
feeding said amplified composite video signal to circuit means for producing a DC correction signal having an average value proportional to said composite video signal;
feeding said averaged correction signal to further modify the blanking pulse level in said amplified composite video signal.

14. A method as set forth in claim 11
impressing a target voltage on said target plate to thereby produce, in cooperation with said electron beam, a varying electric current signal which corresponds to the produced electric image;
impressing said target plate voltage through an ultra-high resistance and a high variable resistance;
adjusting said variable resistance to establish an optimum target plate voltage for the desired camera output signal, whereby minute variations in target plate current flowing through said ultra-high resistors act to raise or lower the target plate voltage in relation to said selected level to compensate for wide variations of light intensity projected onto said target plate.

* * * * *